(12) United States Patent
Lv et al.

(10) Patent No.: US 11,586,353 B2
(45) Date of Patent: Feb. 21, 2023

(54) OPTIMIZED ACCESS TO HIGH-SPEED STORAGE DEVICE

(71) Applicant: EMC IP Holding Company LLC, Hopkinton, MA (US)

(72) Inventors: Shuo Lv, Beijing (CN); Leihu Zhang, Beijing (CN); Huan Chen, Beijing (CN); Chen Gong, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 70 days.

(21) Appl. No.: 16/880,271

(22) Filed: May 21, 2020

(65) Prior Publication Data
US 2021/0132801 A1 May 6, 2021

(30) Foreign Application Priority Data
Oct. 30, 2019 (CN) .......................... 201911045028.6

(51) Int. Cl.
*G06F 3/06* (2006.01)
*G06F 8/71* (2018.01)

(52) U.S. Cl.
CPC .......... *G06F 3/0604* (2013.01); *G06F 3/0613* (2013.01); *G06F 3/0649* (2013.01); *G06F 3/0659* (2013.01); *G06F 3/0683* (2013.01); *G06F 8/71* (2013.01)

(58) Field of Classification Search
CPC .... G06F 3/0604; G06F 3/0613; G06F 3/0659; G06F 3/0683; G06F 3/0649; G06F 8/71
See application file for complete search history.

(56) References Cited

U.S. PATENT DOCUMENTS

| | | | |
|---|---|---|---|
| 9,473,527 B1* | 10/2016 | Zheng ................... | G06F 21/564 |
| 10,075,551 B1* | 9/2018 | Baldwin ............... | H04L 67/568 |
| 10,528,257 B2 | 1/2020 | Gao et al. | |
| 10,860,481 B2 | 12/2020 | Xu et al. | |
| 2004/0268049 A1* | 12/2004 | Madter ............... | G06F 12/0888 |
| | | | 711/133 |
| 2005/0044321 A1* | 2/2005 | Bialkowski ........... | G06F 12/084 |
| | | | 711/167 |
| 2009/0327591 A1* | 12/2009 | Moshayedi ......... | G06F 11/1441 |
| | | | 711/103 |
| 2017/0228012 A1* | 8/2017 | Shirota .................... | G06F 1/329 |
| 2020/0020360 A1* | 1/2020 | Kosuru ............... | G11C 11/1675 |

* cited by examiner

*Primary Examiner* — Jae U Yu
(74) *Attorney, Agent, or Firm* — BainwoodHuang (57) ABSTRACT

Techniques for storage management involve: in accordance with a determination that an input/output (I/O) request of a storage system is received, determining a target storage device to which the I/O request is directed. The techniques further involve: in accordance with a determination that the target storage device is a storage device of a first type, processing the I/O request by accessing a memory of the storage system. The techniques further involve: in accordance with a determination that the target storage device is a storage device of a second type different from the first type, processing the I/O request without accessing the memory, the storage device of the second type having an access speed higher than that of the storage device of the first type. Accordingly, such techniques can improve performance of a storage system.

24 Claims, 8 Drawing Sheets

OPTIMIZED ACCESS TO HIGH-SPEED STORAGE DEVICE

CROSS-REFERENCE TO RELATED APPLICATION

This application claims priority to Chinese Patent Application No. CN201911045028.6, on file at the China National Intellectual Property Administration (CNIPA), having a filing date of Oct. 30, 2019, and having "OPTIMIZED ACCESS TO HIGH-SPEED STORAGE DEVICE" as a title, the contents and teachings of which are herein incorporated by reference in their entirety.

FIELD

Embodiments of the present disclosure generally relate to computer systems or storage systems, and more particularly, to a method for storage management, an electronic device and a computer program product.

BACKGROUND

Generally, a storage system may have multiple types of storage devices, such as non-volatile storage devices. These storage devices may include traditional storage devices, for example, hard disk drive (HDD) storage devices, solid state drive (SSD) storage devices, NAND flash storage devices, and so on. In addition, storage devices in a storage system may also include storage devices employing emerging technologies. For example, 3D XPoint is a non-volatile memory (NVM) technology that has appeared in recent years. In 3D XPoint storage devices, bit storage is based on a change of bulk resistance, in conjunction with a stackable cross-gridded data access array.

As a kind of storage-level memory (SCM), a 3D XPoint storage device has the advantage of no data loss when power-down, compared with a dynamic random access memory (DRAM). In addition, compared with traditional storage devices, it not only reads and writes faster, but also supports byte-level access. Traditional storage devices normally require reading and writing according to pages and data may be erased according to a data block of several hundred pages. Therefore, 3D XPoint storage devices can implement data storage with high performance and flexibility. In theory, 3D XPoint storage devices are about 1000 times faster than traditional NAND Flash storage devices, and thus its access latency may be very low, around merely 100 nanoseconds.

However, traditional storage systems have not been designed and optimized for such storage devices that support fast access (for example, 3D XPoint storage devices, hereinafter referred to as fast storage devices for short), so that the performance advantages of such storage devices cannot be fully utilized, resulting in a poor user experience in many scenarios.

SUMMARY

Embodiments of the present disclosure relate to a method for storage management, an electronic device and a computer program product.

In a first aspect of the present disclosure, there is provided a method for storage management. The method includes: in accordance with a determination that an input/output (I/O) request of a storage system is received, determining a target storage device to which the I/O request is directed. The method also includes: in accordance with a determination that the target storage device is a storage device of a first type, processing the I/O request by accessing a memory of the storage system. The method further includes: in accordance with a determination that the target storage device is a storage device of a second type different from the first type, processing the I/O request without accessing the memory, the storage device of the second type having an access speed higher than that of the storage device of the first type.

In a second aspect of the present disclosure, there is provided an electronic device. The electronic device includes at least one processor and at least one memory storing computer program instructions. The at least one memory and the computer program instructions are configured, with the at least one processor, to cause the electronic device to: in accordance with a determination that an input/output (I/O) request of a storage system is received, determine a target storage device to which the I/O request is directed. The at least one memory and the computer program instructions are also configured, with the at least one processor, to cause the electronic device to: in accordance with a determination that the target storage device is a storage device of a first type, process the I/O request by accessing a memory of the storage system. The at least one memory and the computer program instructions are further configured, with the at least one processor, to cause the electronic device to: in accordance with a determination that the target storage device is a storage device of a second type different from the first type, process the I/O request without accessing the memory, the storage device of the second type having an access speed higher than that of the storage device of the first type.

In a third aspect of the present disclosure, there is provided a computer program product. The computer program product is tangibly stored on a non-transitory computer readable medium and includes machine executable instructions. The machine executable instructions, when executed, cause a machine to perform the steps of the method of the first aspect.

It is to be understood that the content of the present disclosure is not intended to limit the scope of the present disclosure. Other features of the present disclosure will be readily understood by the following description.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings.

Throughout the drawings, the same or similar reference numerals are used to refer to the same or similar components.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of example embodiments disclosed herein will now be described with reference to various example embodiments illustrated in the drawings. It should be appreciated that description of those embodiments is merely to enable those skilled in the art to better understand and further implement example embodiments disclosed herein and is not intended for limiting the scope disclosed herein in any manner.

As described above, traditional storage systems have not been designed and optimized for fast storage devices (for example, 3D XPoint storage devices), so that the performance advantages of such storage devices cannot be fully utilized, resulting in a poor user experience in many scenarios. Specifically, in a storage system, a fast storage device can be directly attached to a memory bus, thereby reducing the access latency. In addition, a processor of the storage system can access the fast storage device to store data through memory load/store instructions. Therefore, compared with traditional storage devices, fast storage devices generally have a shorter I/O delay and a higher bandwidth. However, file systems of a traditional storage system assume the underlying storage devices are I/O bus attached block devices, and the file systems are not designed for fast storage devices.

In general, a fast storage device (for example, a 3D XPOINT storage device) is regarded as a disk-like block device in a storage system, so a file system can be created on the fast storage device, making it look like a normal disk. But the specific physical properties of a fast storage device are completely different from a traditional storage device. For example, in terms of read and write delays, a fast storage device can reach the level of close to a dynamic random access memory. Therefore, the fast storage device is unmatched with a traditional storage system. This poses a problem for the file system of the traditional storage system. A traditional file system (for example, the UFS64 file system) is designed for storage disks and solid state drive storage devices.

In view of the above problems and potential other problems in the traditional solutions, embodiments of the present disclosure propose a technical solution for optimizing access of a fast storage device. In particular, it is proposed to realize an optimized file system (for example, an optimized UFS64 file system) for a fast storage device (for example, a 3D XPoint storage device) in a unity storage system. In some embodiments, the fast storage device (for example, the 3D) (Point storage device) may be directly accessed via a memory bus, may be byte addressable, may be non-volatile, and can be accessed at a speed close to a random access memory.

Embodiments of the present disclosure can allow file data in a fast storage device to be accessed without going through a data cache in the memory, thereby reducing the overhead of unnecessary buffer or cache access (including hash calculations and look up operations), avoiding ineffective cache copy operations and saving processor cycles. Compared to a traditional design, the storage system of embodiments of the present disclosure has a better bandwidth and a lower latency, while reducing I/O stack layers and avoiding unnecessary memory copy overhead. In summary, embodiments of the present disclosure can improve performance of a storage system. Some example embodiments of the present disclosure are described in detail below with reference to FIGS. 1 to 5.

Figure 1:
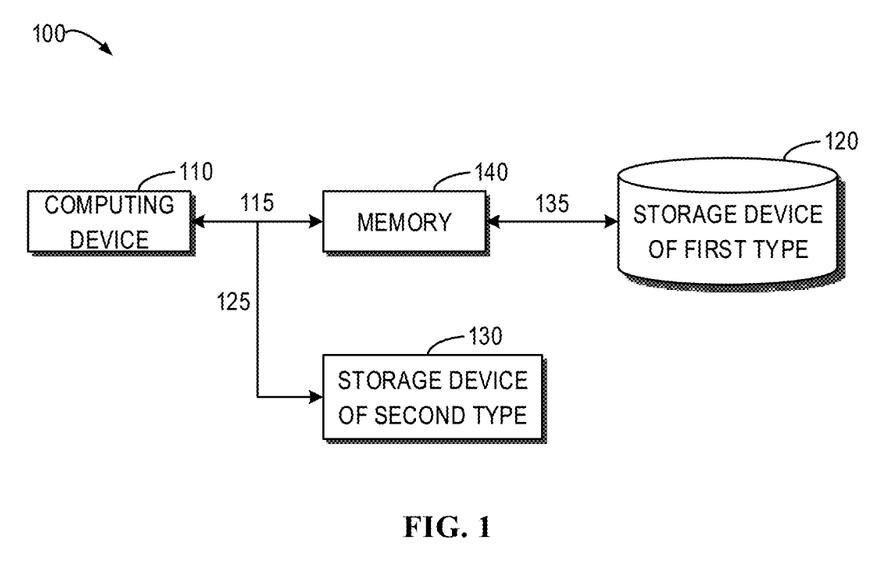
FIG. 1 illustrates a schematic diagram of a storage system in which embodiments of the present disclosure may be implemented.

FIG. 1 illustrates a schematic diagram of a storage system 100 in which embodiments of the present disclosure may be implemented. As shown in FIG. 1, the system environment 100 can include a computing device 110 controlling and managing the storage system 100. For example, the computing device 110 may process access requests to data stored in the storage system 100, organize and manage data (or files) in the storage system 100, control and access other devices or components in the storage system 100, and so on. More generally, the computing device 110 may implement any computing function, control function, or processing function related to the storage system 100.

The storage system 100 may also include a storage device 120 of a first type, which may be used to store various data (or files). In some embodiments, the storage device 120 may include a slow or conventional storage device. That is, the access speed at which the computing device 110 directly accesses the storage device 120 is relatively slow, for example, slower than the access speed at which the computing device 110 accesses a memory 140. Therefore, when accessing the storage device 120, the computing device 110 may use the memory 140 (for example, setting a data cache in the memory 140) to cache data associated with the storage device 120, in order to improve access performance of the storage device 120. To this end, the computing device 110 may be connected to the memory 140 via a communication link 115, and the memory 140 is in turn connected to the storage device 120 via a communication link 135. In some embodiments, the communication link 115 may include a memory bus in the storage system 100, and the communication link 135 may include an I/O bus in the storage system 100.

The storage system 100 may further include a storage device 130 of a second type, which may also be used to store various data (or files). In some embodiments, the storage device 130 may include a fast or emerging storage device. That is, the speed at which the computing device 110 directly accesses the storage device 130 is relatively fast, for example, equal to or close to the speed at which the computing device 110 accesses the memory 140. Therefore, in accessing the storage device 130, the computing device 110 may not need to use the memory 140 to cache data associated with the storage device 130. Accordingly, the computing device 110 may be directly connected to the storage device 130 via the communication link 125. In some embodiments, the communication link 125 may include a memory bus in the storage system 100.

In some embodiments, the computing device 110 may include any device capable of implementing computing functions and/or control functions, including but not limited to, a special-purpose computer, a general-purpose computer, a general-purpose processor, a microprocessor, a microcontroller, or state machine. The computing device 110 may also be implemented as an individual computing device or a combination of computing devices, for example, a combination of a digital signal processor (DSP) and a microprocessor, multiple microprocessors, one or more microprocessors in conjunction with a DSP core, or any other such configurations. In some embodiments, the computing device 110 may further include a processor and a memory that operates in cooperation with the processor, and the memory may be different from the memory 140 of the storage system 100. It is also to be noted that in the context of the present disclosure, the computing device 110 may also be referred to as an electronic device 110, and these two terms are used interchangeably herein.

In some embodiments, the storage device 120 of the first type may be any storage-capable device capable of enhancing access performance through the data caching function of the memory 140, including but not limited to, a hard disk (HDD), solid-state disk (SSD), a removable disk, a compact disk (CD), a laser disk, an optical disk, a digital versatile disk (DVD), a floppy disk, a Blu-ray disc, a serial attached small computer system interface (SCSI) storage disk (SAS), a serial advanced technology attached (SATA) storage disk, any other magnetic storage devices and any other optical storage devices, or any combination thereof.

In some embodiments, the storage device 130 of the second type may be any storage device capable of supporting fast access (for example, equal to or close to the access speed of the memory 140). That is, the storage device 130 of the second type has an access speed higher than that of the storage device 120 of the first type. As one example, the storage device 130 may include a 3D XPoint storage device. It is to be understood that embodiments of the present disclosure may be applicable to any existing or future developed storage device having an access speed higher than that of conventional storage devices. For example, the higher access speed may be equal to or close to the access speed at which a computing device (for example, a central processing unit) accesses a memory (for example, a random access memory).

In some embodiments, the memory 140 may be a storage device that can be quickly accessed by the computing device 110 (for example, through the memory bus 115) for short-term storage purposes, including but not limited to, a dynamic random access memory (DRAM), a fast page mode (FPM) DRAM, an extended data output (EDO) DRAM, a synchronous dynamic random access memory (SDRAM), or the like. In addition, the memory 140 may be any high-speed random access memory similar to a DRAM. If there is no substantial limit on the number of accessible upper limits, the memory 140 may also use a non-volatile semiconductor memory such as a magneto resistive random access memory (MRAM) or a ferroelectric random access memory (Fe-RAM).

In some embodiments, the communication links 115, 125 and 135 may be any form of connection or coupling capable of enabling data communications or control signal communications between various components of the storage system 100, including but not limited to, coaxial cables, fiber optic cables, twisted pairs, or wireless technologies (such as infrared, radio, and microwave). In some embodiments, the communication links 115, 125, and 135 may also include, but are not limited to, network cards, hubs, modems, repeaters, bridges, switches, routers and other devices used for network connection, and various network connection lines, wireless links, or the like. In some embodiments, the communication links 115, 125, and 135 may include various types of buses. In other embodiments, the communication links 115, 125, and 135 may include a computer network, a communication network, or other wired or wireless networks.

It should be understood that FIG. 1 only schematically illustrates units, modules, or components in the storage system 100 related to embodiments of the present disclosure. In practice, the storage system 100 may also include other units, modules, or components for other functions. Further, the specific numbers of units, modules or components shown in FIG. 1 are only for example and are not intended to limit the scope of the present disclosure in any way. In other embodiments, the storage system 100 may include any suitable number of computing devices, storage devices of the first type, storage devices of the second type, more types of storage devices and memories, and so on. Therefore, embodiments of the present disclosure are not limited to the specific devices, units, modules, or components depicted in FIG. 1, but are generally applicable to any environment of a storage system having a data or file storage function. A storage management method according to an embodiment of the present disclosure is described below with reference to FIG. 2.

Figure 2:
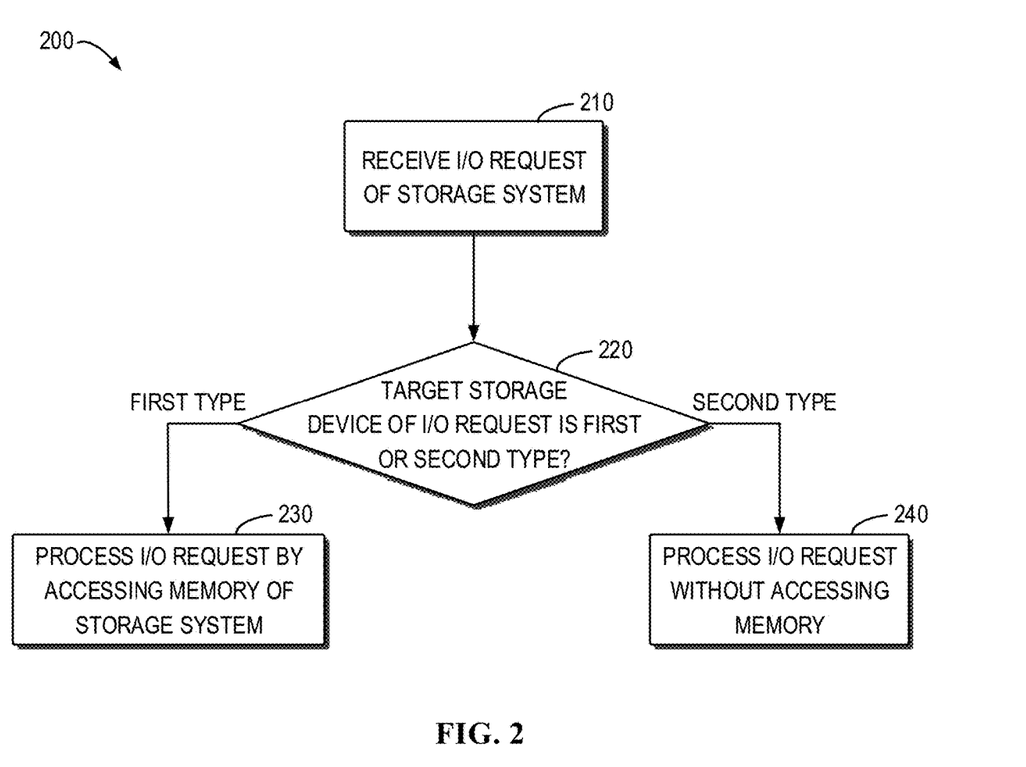
FIG. 2 illustrates a flow chart of a method for storage management in accordance with an embodiment of the present disclosure.

FIG. 2 illustrates a flow chart of a method 200 for storage management in accordance with an embodiment of the present disclosure. In some embodiments, the method 200 can be implemented by the computing device 110 of the storage system 100, for example, by a processor or a processing unit of the computing device 110 or by various functional modules of the computing device 110. In other embodiments, the method 200 can also be implemented by a computing device independent from the storage system 100, or by other units or modules in the storage system 100. For ease of discussion, the method 200 will be described in conjunction with FIG. 1.

At 210, the computing device 110 determines that an I/O request for the storage system 100 is received. In some embodiments, the I/O request may be issued by a user of the storage system 100. It is to be understood that the user of the storage system 100 may be a person using the storage system 100, or may be another network device or system using a storage service provided by the storage system 100, or the like. In some embodiments, the user may issue the I/O request through a file system of the storage system 100. Generally, in the embodiments of the present disclosure, the user can use any suitable file system to access files or data in the storage system 100, including but not limited to, a UNIX file system, a FAT file system, an NTFS file system, a network file system (NFS), a common internet file system (CIFS), and so on.

For example only, the I/O request issued by the user may be a request to read data (for example, a file) from the storage system 100 or a request to write data (for example, a file) to the storage system 100. More generally, the I/O request issued by the user may be any request or instruction related to the storage system 100 performing an input operation or an output operation. In particular, the I/O request issued by the user may be a request to access the storage device 120 of the first type, for example, reading data from or writing data to the storage device 120, and so on. Alternatively, the I/O request issued by the user may be a request to access the storage device 130 of the second type, for example, reading data from or writing data to the storage device 130, and so on.

With continued reference to FIG. 2, at 220, the computing device 110 determines a target storage device to which the I/O request of the storage system 100 is directed. That is, after the storage system 100 receives the I/O request, the computing device 110 may determine whether the target storage device targeted by the I/O request is the storage device 120 of the first type or the storage device 130 of the second type. For example, if the I/O request is to read data from or write data to the storage device 120, the computing device 110 may determine that the target storage device is the storage device 120 of the first type. As another example, if the I/O request is to read data from or write data to the storage device 130, the computing device 110 may determine that the target storage device is the storage device 130 of the second type.

Generally, the computing device 110 may use any suitable manner to determine the target storage device of the I/O request. For example, the storage device to be accessed may have been specified in the I/O request. In this case, the computing device 110 may determine the target storage device directly from the I/O request. As another example, the I/O request may specify a file or data to be accessed, and then the computing device 110 may determine the target storage device of the I/O request based on the file or data. In other embodiments, the computing device 110 may determine the target storage device of the I/O request through an identifier of the target data to which the I/O request is directed.

For example, the computing device 110 may generate an identifier associated with data in the storage device 130 of the second type, to indicate that the data is stored in the storage device 130. In this manner, the storage system 100 of the embodiments of the present disclosure can be implemented with fewer changes to existing storage systems. For example, if the storage device 130 of the second type is added to an existing storage system including the storage device 120 of the first type, the computing device 110 only needs to identify data that needs special processing, that is, the data stored in the storage device 130 of the second type. The data can be specially processed without changing other hardware and software configurations of the existing storage system. Specifically, when data is stored in the storage device 130, it can be organized and managed by files. To this end, the storage system 100 may generate an inode for the file to record information related to the file. Therefore, the computing device 110 may identify that a file is stored in the storage device 130 in an inode of the file in the storage device 130.

In some embodiments, the computing device 110 may introduce a new inode flag in the inode of a file in the storage device 130, to indicate that I/O requests directed for the file involves a file allocated on the storage device 130 (or its backing store files). Hereinafter, such an I/O request may be referred to as a direct access I/O request. In order to determine code paths to take when the I/O request is sent to the storage device 130, the distinguishing of an inode by such a flag would be advantageous. For example, when an I/O request directed to a inode with the new flag is detected, the computing device 110 may take several steps to ensure direct access to the storage device 130 and avoid access to the memory 140, for example, buffered writes or data cache updates are not performed. If the storage device 130 is a 3D Xpoint storage device, the computing device 110 may mark the inode as bypassing the data cache in the memory 140 by setting an S_3DXPOINT flag in the i_flags of the inode.

The computing device 110 may set the inode flag during every inode allocation, and determine whether the inode flag is set or not when the inode is created. If an inode is created in a file system enabled to bypass the data cache in the memory 140, then the inode flag needs to be set. Mounting a file system with this extended function can ensure that every inode (and corresponding) file created on the file system may set this new flag to bypass the data cache in memory 140. The new flag can help the computing device 110 determine the correct function to invoke when processing I/O requests as well as avoid calling unnecessary functions like performing buffered writes and cache operations. In addition, in order to identify the inodes of files and directories on the storage device 130, other access approaches and macro instructions may be added to the file system of the storage system 100. In some embodiments, the computing device 110 may turn off and turn on the extended function via file system mount parameters, but for ease of implementation, the extended function may be enabled by default.

If the data in the storage device 130 of the second type carries the above identifier (which indicates that the data is stored in the storage device 130), the computing device 110 may determine whether target data to which the I/O request of the storage system 100 is directed has the identifier. If the target data does not have the identifier, the computing device 110 may determine that the target storage device of the I/O request is the storage device 120 of the first type. Conversely, if the target data has the identifier, the computing device 110 may determine that the target storage device of the I/O request is the storage device 130 of the second type. In this manner, the computing device 110 may only need to set the identifier for one type of storage device, thereby minimizing the overhead for setting the data identifier.

It is to be understood that embodiments of the present disclosure are not limited to setting identifiers associated with data in the storage device 130 of the second type, and other identifier setting manners are also possible. For example, the storage system 100 may identify the target storage device to which an I/O request is directed by setting an identifier associated with the data in the storage device 120 of the first type. As another example, the storage system 100 may set corresponding identifiers for the data in the storage device 120 and the data in the storage device 130 respectively. This manner can be simply and conveniently extended to the case that the storage system 100 also includes more types of storage devices.

With continued reference to FIG. 2, at 230, if the target storage device to which the I/O request is directed is the storage device 120 of the first type, the computing device 110 processes the I/O request by accessing the memory 140 of the storage system 100. As mentioned above, the storage device 120 of the first type may include a non-volatile storage device with a relatively slow access speed, for example, a solid state drive (SSD) storage device, a hard drive (HDD) storage device, a NAND flash storage device, and so on. Therefore, processing I/O requests directed to the storage device 120 by buffering data associated with the storage device 120 in the memory 140 may improve I/O performance. In general, the computing device 110 may cache "hot data" that has been frequently accessed recently in the storage device 120 in a data cache in the memory 140. In this way, when the user needs to access certain data, if the data is cached in the memory 140, the computing device 110 can quickly read the data from the memory 140, thereby avoiding reading the data from the slow storage device 120.

More specifically, if the I/O request of the storage system 100 is to read data from the storage device 120 of the first type, the computing device 110 may first search for the data in the memory 140 to determine whether the data is cached in the memory 140. If the data is found in the memory 140, the computing device 110 can read the data from the memory 140, avoiding reading the data from the storage device 120. As such, the computing device 110 can provide the required data to the user more quickly, thereby reducing the processing delay of the I/O request. On the other hand, if the data is not found in the memory 140, the computing device 110 may read the data from the storage device 120 of the first type. Then, the computing device 110 may cache the read data in the memory 140, so that the user can directly read the data from the memory 140 if the user accesses the data again within a short time.

In some embodiments, in order to ensure the consistency of the written data in the storage device 120 and in the memory 140, when writing data to the storage device 120, the computing device 110 also performs lookup and update operations in the memory 140. Specifically, if the I/O request of the storage system 100 is to write an updated version of data to the storage device 120 of the first type, the computing device 110 may first search for the previous version of the data in the memory 140. If no previous version is found in the memory 140, the computing device 110 may cache the updated version of the data in the memory 140, so that the user can quickly read the latest version of the data from the memory 140 if the user accesses the data again within a short time. The computing device 110 may then write the updated version of the data into the storage device 120 of the first type.

On the other hand, if a previous version of the data is found in the memory 140, the computing device 110 may use the updated version of the data to replace the previous version of the data in the memory 140, so that the user can access the latest version of data if the user accesses the data again in a short time. The computing device 110 may then write the updated version of the data into the storage device 120 of the first type. In this way, the computing device 110 can ensure that the data is the latest version in both the storage device 130 and the memory 140.

In some embodiments, in order to cache data associated with the storage device 120 of the first type in the memory 140, the storage system 100 may set a data cache in the memory 140, and the data cache may include multiple components or modules. A modular implementation of a system architecture for accessing the storage device 120 of the first type is described below with reference to FIG. 3.

Figure 3:
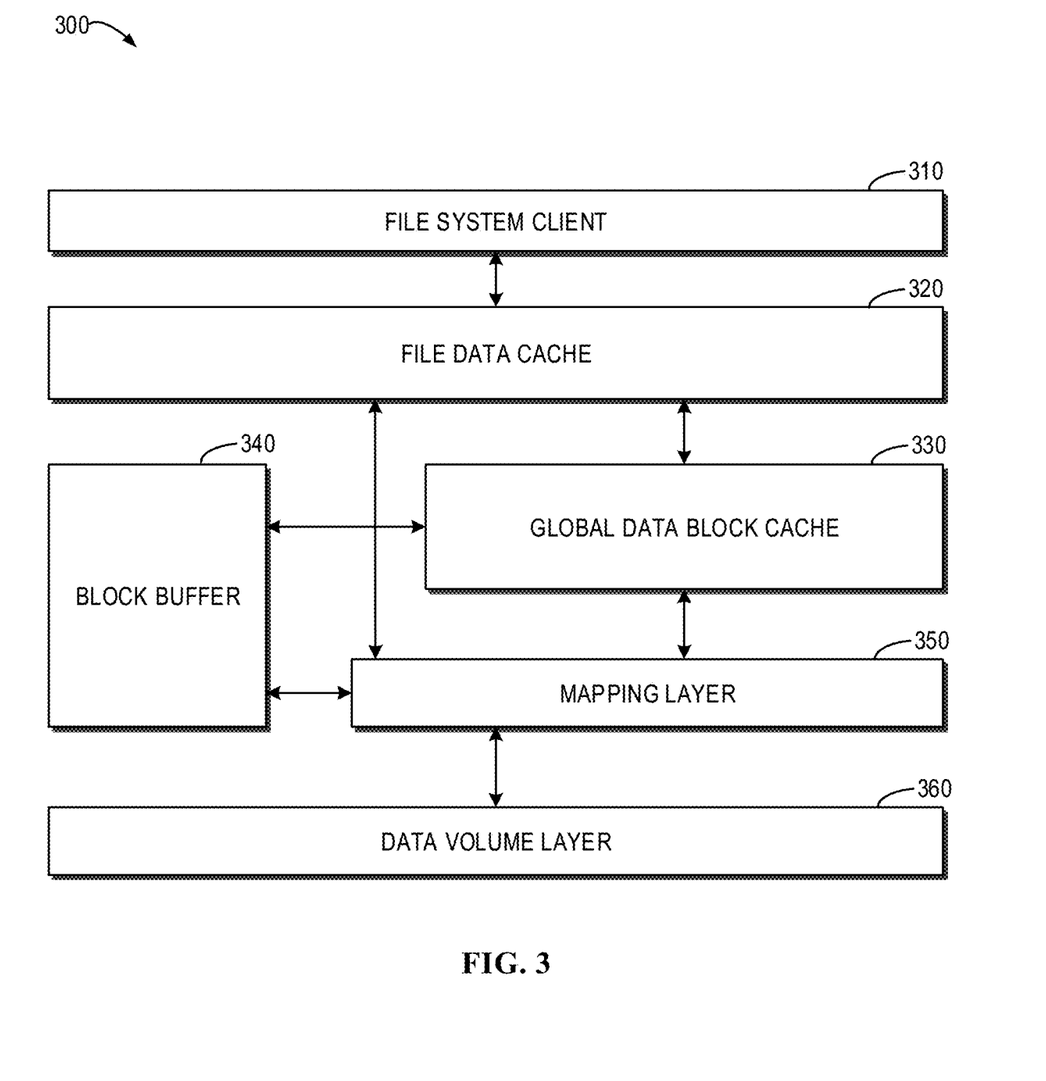
FIG. 3 illustrates a modular system architecture for accessing a storage device of a first type in accordance with an embodiment of the present disclosure.

FIG. 3 illustrates a modular system architecture 300 for accessing the storage device 120 of the first type in accordance with an embodiment of the present disclosure. It should be understood that the system architecture 300 of the storage system 100 with various modules shown in FIG. 3 is merely for example and is not intended to limit the scope of the present disclosure in any way. In other embodiments, the storage system 100 may employ any other suitable system architecture, which may include more or fewer modules, or include modules different from those as shown.

As shown in FIG. 3, the system architecture 300 may include a file system client 310, a file data cache 320, a global data block cache 330, a block buffer 340, a mapping layer 350, and a data volume layer 360. In some embodiments, the file data cache 320, the global data block cache 330, and the block buffer 340 may be disposed in the memory 140 of the storage system 100 and constitute the aforementioned data cache.

In some embodiments, the file data cache 320 may be a layer providing an application program interface to access and manage files, which may map <FS, file, offset> to descriptors of the global data block cache 330 for dirty data block or stable data blocks cached in a dynamic random access memory, where "FS" represents the file system, "file" represents the file, and "offset" represents the offset of the file. The global data block cache 330 may be a manager of the data block descriptors in a cache, which may maintain consistency access, reference count, single instancing and validity of data blocks in the cache.

The block buffer 340 can be a super class of buffer cached, which hides the difference of the implementation between the buffer managers: the buffer for file and the SP cache for data blocks. It provides a common application program interface to the global data block cache 330 or the mapping layer 350 and data logs in the dynamic random access memory. The mapping layer 350 may be a file system manager, which provides an application program interface to access, manage files, and maintain the consistency of file mapping. The data volume layer 360 may provide data path container volume-level semantics that are translated into block-level I/O requests. The data volume-layer 360 may be used as a network-attached storage (NAS) volume layer interface of an upper file system.

In the process of processing the I/O request directed to the storage device 120 by accessing the memory 140, the I/O request issued through the file system client 310 can be sent to the file data cache 320, and then the file data cache 320 can interact with the global data block cache 330 and the block buffer 340 to determine whether data to be accessed by the user is cached in one or more caches of the file data cache 320, the global data block cache 330, and the block buffer 340.

If the data to be accessed by the user is cached in one or more caches of the file data cache 320, the global data block cache 330, and the block buffer 340, the computing device 110 returns the data to be accessed by the user from these caches to the file system client 310, without accessing the mapping layer 350 and the data volume layer 360. Conversely, if the data to be accessed by the user is not cached in one or more caches of the file data cache 320, the global data block cache 330, and the block buffer 340, the computing device 110 needs to read the data from or write the data to the storage device 120 of the first type through the mapping layer 350 and the data volume layer 360.

Referring back to FIG. 2, at 240, if the target storage device of the I/O request of the storage system 100 is the storage device 130 of the second type, the computing device 110 processes the I/O request and avoids accessing the memory 140. As noted above, the storage device 130 of the second type has an access speed higher than that of the storage device 120 of the first type. For example, the access speed of the storage device 130 may be equal to or close to the access speed of the memory 140.

In this case, the computing device 110 may not need to cache the data associated with the storage device 130 using the memory 140, but may read the data directly from or write the data directly to the storage device 130, for example, via the memory bus 125 of the storage system 100. In this manner, the computing device 110 may enable high-speed access to the storage device 130 close to that of the memory 140. It should be understood that the computing device 110 accessing the storage device 130 through the memory bus is merely for example and is not intended to limit the scope of the present disclosure in any way. In other embodiments, the computing device 110 may also access the storage device 130 at high speed through any other suitable bus or any communication link.

As mentioned above, in order to improve the access performance of the storage device 120 of the first type, the computing device 110 may set a data cache (for example, the file data cache 320, the global data block cache 330, and the block buffer 340, or the like) in the memory 140 to cache data associated with the storage device 120, and use the system architecture 300 as shown in FIG. 3 to access the storage device 120 of the first type. In some embodiments, since the computing device 110 does not need to access the memory 140 when accessing the storage device 130 of the second type, the computing device 110 may use a separate system architecture completely different from the system architecture 300 to access the storage device 130 of the second type.

However, in other embodiments, in order to enable the storage device 120 of the first type and the storage device 130 of the second type to share the same modules or components of the system architecture of the storage system 100 as much as possible, to reduce the complexity of the system architecture the storage system 100, the computing device 110 can receive I/O requests directed to the storage device 130 of the second type through the data cache in the memory 140 for the storage device 120, without caching the data associated with the storage device 130 in the data cache.

That is, similar to the I/O request directed to the storage device 120, the I/O request directed to the storage device 130 can also be sent to the data cache (for example, the file data cache 320) in the memory 140, and then the I/O request is transferred to the underlying physical storage device 130 through the data cache to access the data stored therein, but the data associated with the storage device 130 is not cached in the data cache. A modular implementation of a system architecture for accessing the storage device 130 of the second type is described below with reference to FIG. 4 to further illustrate and explain the foregoing manner.

Figure 4:
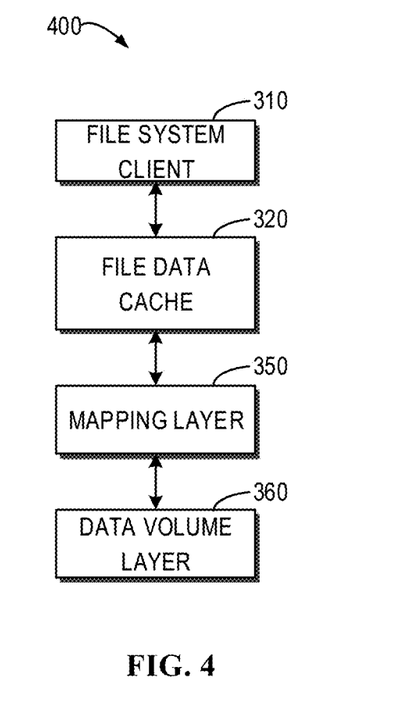
FIG. 4 illustrates a modular system architecture for accessing a storage device of a second type in accordance with an embodiment of the present disclosure.

FIG. 4 illustrates a modular system architecture 400 for accessing the storage device 130 of the second type in accordance with an embodiment of the present disclosure. It should be understood that the system architecture 400 of the storage system 100 with various modules shown in FIG. 4 is merely for example and is not intended to limit the scope of the present disclosure in any way. In other embodiments, the storage system 100 may employ any other suitable system architecture, which may include more or fewer modules, or include modules different from those as shown.

As shown in FIG. 4, when accessing the storage device 130 of the second type, the I/O request issued by the user through the file system client 310 can be similarly sent to the file data cache 320, and the file data cache 320 can interact directly with the mapping layer 350 through bypassing the global data block cache 330 and the block buffer 340 in FIG. 3. Specifically, a read operation for the storage device 130 may be processed between the file data cache 320 and the mapping layer 350. The following uses reading 8KB data on the file system as an example to describe the read operation and the interaction between the various components of the file system from a high level. First, the file system client 310 sends a read request for the data of the storage device 130 to the file data cache 320, for example, Read(PF, offset=0, 8KB, . . . ), where "PF" represents the name of the file system and "offset" represents the file logical offset, "8KB" represents the size of the data block to be read. Next, the file data cache 320 performs the read operation on the mapping layer 350 by passing a file data cache (FDC) entry, for example, Read(FDCEntry, offset=0, 8KB, . . . ).

The mapping layer 350 then performs a read mapping to map the logical location of the file to the physical location and return the data block range of the file, for example, MFR(PF, FDCEntry, . . . )=>Extent List:: <off:0, fsbn>, where "fsbn" represents the file system block number. Then, based on the file system block number, the mapping layer 350 sends a read request to the data volume layer 360, for example, Read(fsbn, Buf: X, . . . ). Finally, the mapping layer 350 returns the read data to the file system client 310 and acknowledges the read request, for example, Ack(Buf: X). It can be seen that during the read operation on the storage device 130, the file data cache 320 is used only as a functional interface, and not used as a data cache.

Similarly, a write operation on the storage device 130 may also be processed between the file data cache 320 and the mapping layer 350 layer. The following uses writing 8KB data on the file system as an example to describe the write operation and the interaction between the various components of the file system from a high level. First, the file system client 310 sends a data write request to the file data cache 320, for example, Write(PF, offset=0, 8KB, . . . ), where "PF" represents the name of the file system, "offset" represents the logical offset of the file and "8KB" represents the size of the data block to be written. Then, the file data cache 320 performs the write operation on the mapping layer 350 by passing an FDC entry, for example, Write(FDCEntry, offset=0, 8KB, . . . ).

Next, the mapping layer 350 performs a read mapping to map the logical location of the file to the physical location and return the data block range of the file, for example, MFW(PF, FDCEntry, . . . )=>Extent List:: <off:0, fsbn>, where "fsbn" represents the file system block number. Then, based on the file system block number, the mapping layer 350 sends a data write request to the data volume layer 360, for example, Write(fsbn, Buf: X, . . . ). Finally, the mapping layer 350 acknowledges the data write request, for example, Ack(Buf: X). Similarly, during the write operation on the storage device 130, the file data cache 320 is also used only as a functional interface, and not used as a data cache.

Figure 5:
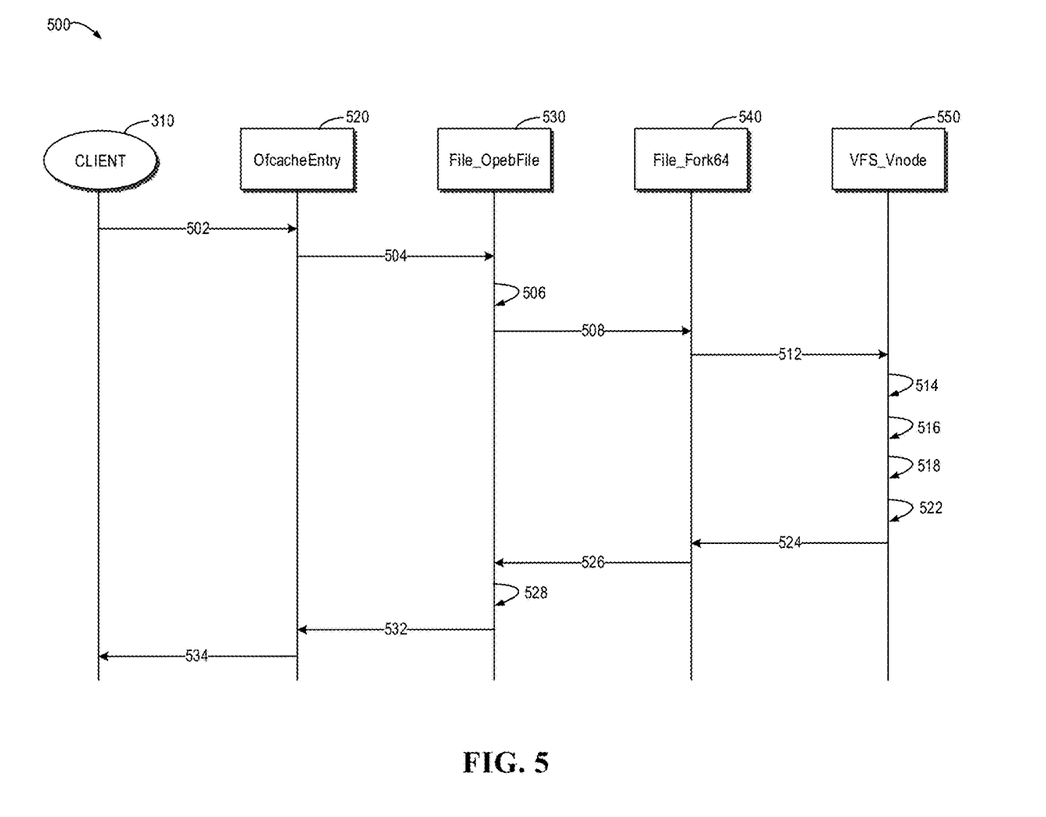
FIG. 5 illustrates a schematic diagram of an interaction process between objects of a file system when reading data from a storage device of a second type in accordance with an embodiment of the present disclosure.

FIG. 5 illustrates a schematic diagram of an interaction process 500 between objects of a file system when reading data from the storage device 130 of the second type in accordance with an embodiment of the present disclosure. It should be understood that the various objects shown in FIG. 5 are merely examples of various objects in the example file system of the storage system 100 and are not intended to limit the scope of the present disclosure in any way. In other embodiments, the file system of the storage system 100 may have any suitable objects, may include more or fewer objects, or include objects different from those as shown.

As shown in FIG. 5, in some embodiments, the objects involved in reading data from the storage device 130 of the second type by the file system client 310 may include an object "OfcacheEntry" 520, an object "File_OpenFile" 530, an object "File_Fork64" 540, and an object "VFS-Vnode" 550, in which the object "OfcacheEntry" 520 is an interface between the protocol layer and the file system layer, and is responsible for interpreting requests from the protocol layer, extracting the offset and length of the read and write requests and sending them to the file system interface. The object "File_OpenFile" 530 belongs to the class File_OpenFile, whose member variable forkPtr with a type pointer pointing to File_Fork. The object "File_Fork64" 540 belongs to the File_Fork class, which has a pointer vnodePtr pointing to a vFS_Vnode object. The object "VFS-Vnode" 550 is a representation of a file in the kernel, which encapsulates the status of the file and the approaches that can be used to perform operations on the file. Vnode represents a file in a file system, hides the implementation of the file system where it resides, and exposes file system-independent data and approaches to the rest of the kernel.

In the process of reading data from the storage device 130 of the second type, after the file system client 310 issues a read request, the storage end of the file system can invoke 502 a function readMsg( ) to receive a protocol message from the file system client 310. Next, the object "OfcacheEntry" 520 parses out the corresponding protocol information, and invokes 504 a function readData( ) to read data from the file system interface. Then, the object "File_OpenFile" 530 first locks the storage area to be read, that is, invokes 506 a function Ranglock( ) to prevent other threads from accessing the data, and then it invokes 508 a function readBlockinternal( ) to send the read request to the object "File_Fork64" 540, which is a cache interface for file data in memory. Then, the object "File_Fork64" 540 invokes 512 block read-write interface function blcoksRead( ), enters the start address and length of the file system, and outputs the corresponding cache content.

Then, the object "VFS-Vnode" 550 invokes 514 a function Map_for_read( ) to obtain the mapping information. Because the corresponding metadata needs to be read before reading and writing data, the object "VFS-Vnode" 550 then invokes 516 a function readExtentListAsync( ) to construct the read/write metadata I/O and sends it to the data volume layer. Next, the object "VFS-Vnode" 550 invokes 518 function waitforcallback( ) to wait for the completion of the metadata I/O sent to the data volume layer, and then invokes 522 a function Commit_map_for_read( ) to release the corresponding resources. When the corresponding mapping information is obtained, the object "File_Fork64" 540 directly reads 524 the underlying volume data thereby reading the data, and then returns 526 to the object "File_OpenFile" 530. Next, the object "File_OpenFile" 530 invokes 528 a function Rangunlock( ) to unlock the access area, and then returns 532 the data to the object "OfcacheEntry" 520. Finally, the object "OfcacheEntry" 520 returns 534 the data to the client 510.

As can be seen from the reading process shown in FIG. 5, the reading process of the storage system 100 for the storage device 130 of the second type avoids looking up and caching interaction and acknowledgement processes between various objects in the data cache of the memory 140, thereby reducing the number of layers of the I/O stacks so as to allow full play to the performance advantage of fast access speed of the storage device 130 of the second type. In addition, it is to be understood that the object interaction process of the file system for writing data to the storage device 130 of the second type is similar to the reading process shown in FIG. 5, so it is not repeated herein.

The optimized performance of the storage system 100 of the embodiments of the present disclosure has been tested and verified through simulations. For example, in an example simulation, a 3D XPoint storage device with a storage capacity of 256G is used as an example of the storage device 130 of the second type to implement a prototype for testing, and some benchmark tests are performed to evaluate its performance. Because the main purpose of 3D XPoint storage devices is to reduce overall I/O latency, the principle for settings in the performed tests is to complete a single-threaded synchronous I/O request at a specific queue depth. The I/O performance test tool used in this test is the "Flexible I/O Tester (FIO)." This tool creates a large file and issues different read/write requests to the file. For the purpose of this simulation test, the simulation performed a sequential read process, a sequential write process, a random read process, and a random write process of various data block sizes. The simulation results are shown in FIGS. 6A to 6D.

Figure 6A:
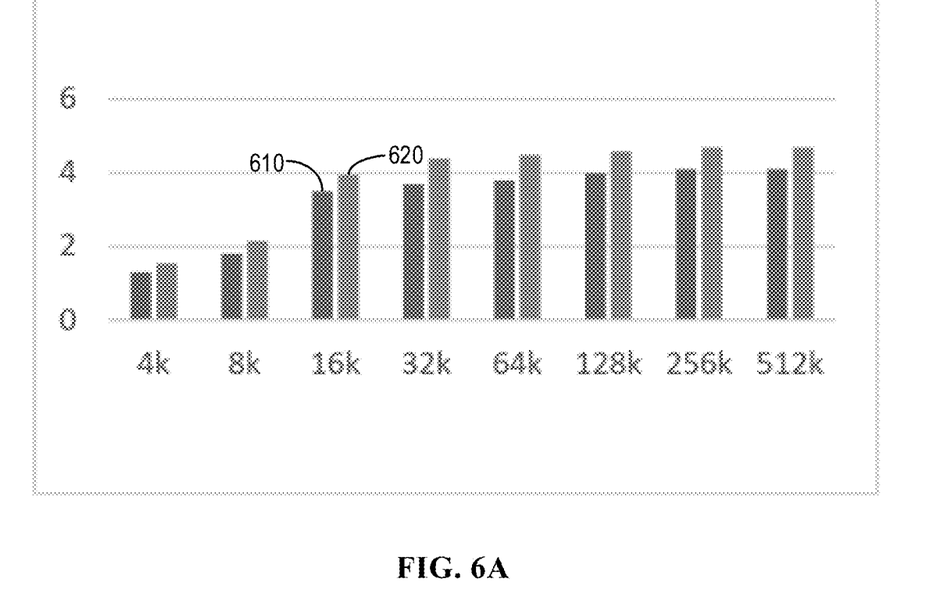
FIG. 6A illustrates a simulation diagram of sequential reading performance of a storage system in accordance with an embodiment of the present disclosure.

FIG. 6A illustrates a simulation diagram of sequential reading performance of the storage system 100 in accordance with an embodiment of the present disclosure. In FIG. 6A, the horizontal axis represents the size of a data block in the storage system 100, in kilobytes (KB), and the vertical axis represents the access speed, in gigabytes per second (GB/s). The bar 610 indicates the speed of reading data from the storage device 120 of the first type when the data block size is 16 KB, and the bar 620 indicates the speed of reading data from the storage device 130 of the second type when the data block size is 16 KB. Similarly, when the data blocks are of other sizes, the bar on the left side represents the reading speed of the storage device 120 of the first type and the bar on the right side represents the reading speed of the storage device 130 of the second type.

Figure 6B:
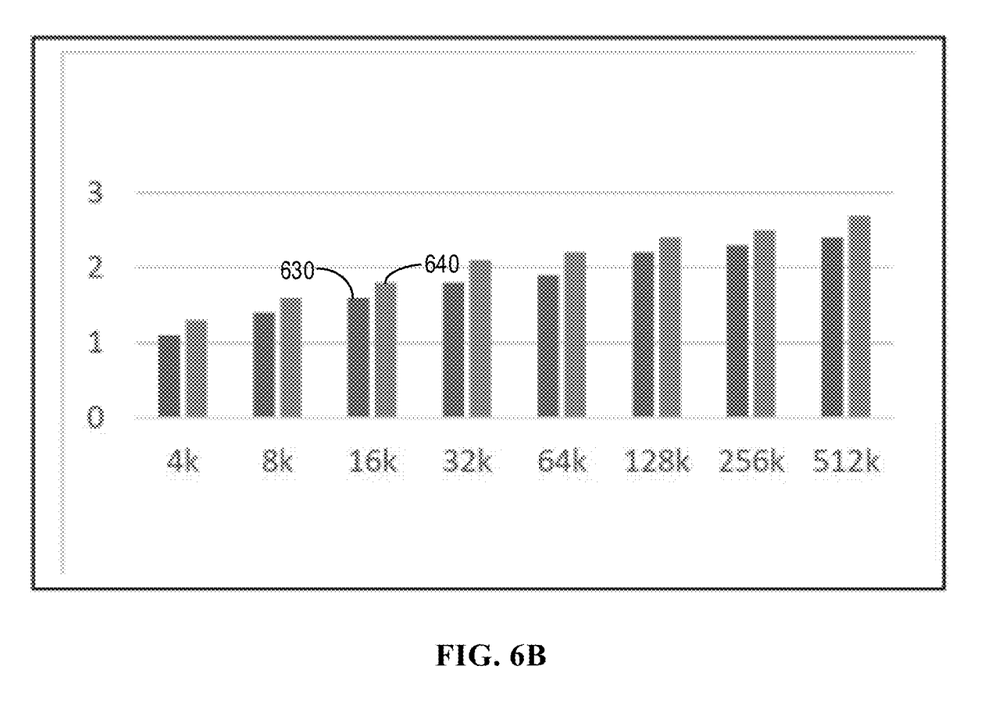
FIG. 6B illustrates a simulation diagram of sequential writing performance of a storage system in accordance with an embodiment of the present disclosure.

FIG. 6B illustrates a simulation diagram of sequential writing performance of the storage system 100 in accordance with an embodiment of the present disclosure. In FIG. 6B, the horizontal axis represents the size of a data block in the storage system 100, in kilobytes (KB), and the vertical axis represents the access speed, in gigabytes per second (GB/s). The bar 630 indicates the speed of writing data to the storage device 120 of the first type when the data block size is 16 KB, and the bar 640 indicates the speed of writing data to the storage device 130 of the second type when the data block size is 16 KB. Similarly, when the data blocks are of other sizes, the bar on the left side represents the writing speed of the storage device 120 of the first type and the bar on the right side represents the writing speed of the storage device 130 of the second type.

Figure 6C:
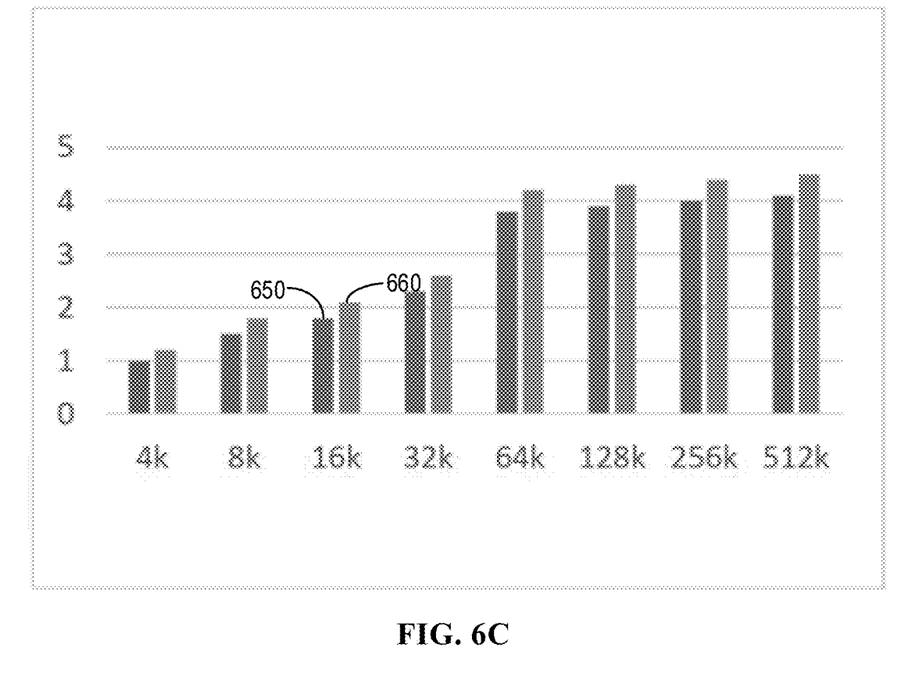
FIG. 6C illustrates a simulation diagram of random reading performance of a storage system in accordance with an embodiment of the present disclosure.

FIG. 6C illustrates a simulation diagram of random reading performance of the storage system 100 in accordance with an embodiment of the present disclosure. In FIG. 6C, the horizontal axis represents the size of a data block in the storage system 100, in kilobytes (KB), and the vertical axis represents the access speed, in gigabytes per second (GB/s). The bar 650 indicates the speed of reading data from the storage device 120 of the first type when the data block size is 16 KB, and the bar 660 indicates the speed of reading data from the storage device 130 of the second type when the data block size is 16 KB. Similarly, when the data blocks are of other sizes, the bar on the left side represents the reading speed of the storage device 120 of the first type and the bar on the right side represents the reading speed of the storage device 130 of the second type.

Figure 6D:
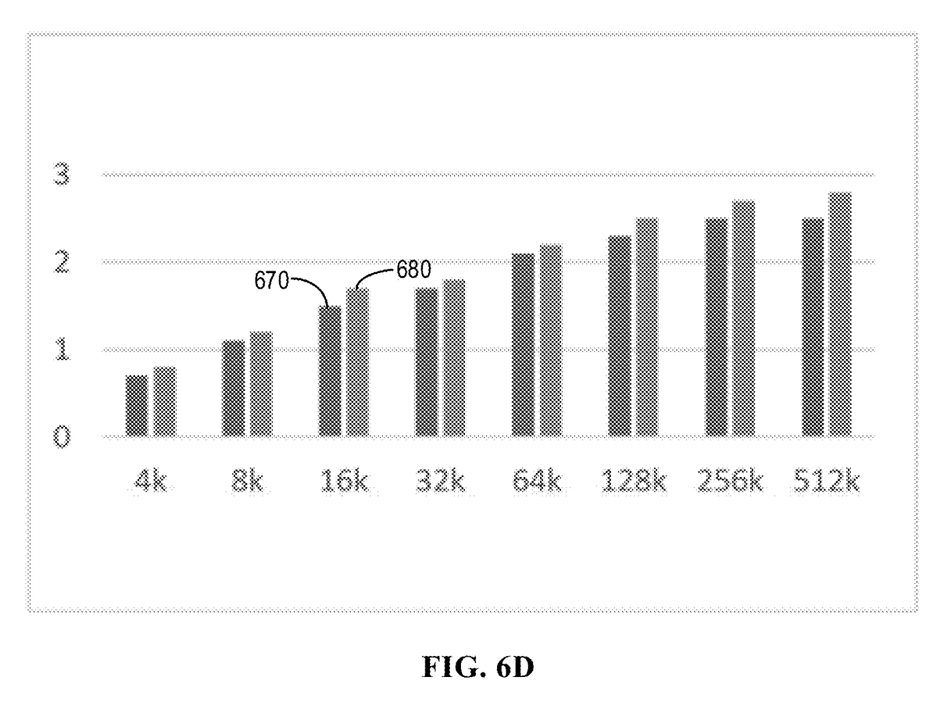
FIG. 6D illustrates a simulation diagram of random writing performance of a storage system in accordance with an embodiment of the present disclosure.

FIG. 6D illustrates a simulation diagram of random writing performance of the storage system 100 in accordance with an embodiment of the present disclosure. In FIG. 6D, the horizontal axis represents the size of a data block in the storage system 100, in kilobytes (KB), and the vertical axis represents the access speed, in gigabytes per second (GB/s). The bar 670 indicates the speed of writing data to the storage device 120 of the first type when the data block size is 16 KB, and the bar 680 indicates the speed of writing data to the storage device 130 of the second type when the data block size is 16 KB. Similarly, when the data blocks are of other sizes, the bar on the left side represents the writing speed of the storage device 120 of the first type and the bar on the right side represents the writing speed of the storage device 130 of the second type.

From the simulation results shown in FIGS. 6A to 6D, it can be seen that the storage system of the embodiments of the present disclosure can provide better storage performance, and in particular, can allow full play to the performance advantages of the storage device 130 of the second type. For example, the storage system of the embodiments of the present disclosure can provide a higher bandwidth and a lower latency, reduce the I/O stack layers, and avoid unnecessary memory copy overhead. The simulation results show that compared with traditional storage systems, the storage systems of the embodiments of the present disclosure can provide better performance by at least 10%-15%.

Figure 7:
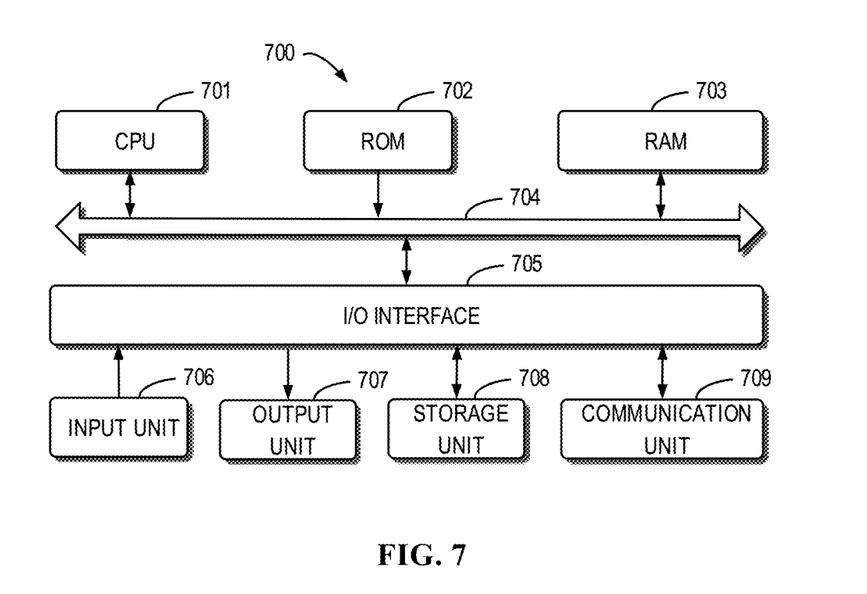
FIG. 7 illustrates a schematic block diagram of a device that can be used to implement embodiments of the present disclosure.

FIG. 7 illustrates a schematic block diagram of a device 700 that can be used to implement embodiments of the present disclosure. In some embodiments, the device 700 may be an electronic device that may be used to implement the computing device 110 in FIG. 1. As shown in FIG. 7, the device 700 includes a central processing unit (CPU) 701 that may perform various appropriate actions and processing based on computer program instructions stored in a read-only memory (ROM) 702 or computer program instructions loaded from a storage section 708 to a random access memory (RAM) 703. In the RAM 703, there further store various programs and data needed for operations of the device 700. The CPU 701, ROM 702 and RAM 703 are connected to each other via a bus 704. An input/output (I/O) interface 705 is also connected to the bus 704.

The following components in the device 700 are connected to the I/O interface 705: an input 706 such as a keyboard, a mouse and the like; an output unit 707 including various kinds of displays and a loudspeaker, or the like; a memory unit 708 including a magnetic disk, an optical disk, and or the like; a communication unit 709 including a network card, a modem, and a wireless communication transceiver, or the like. The communication unit 709 allows the device 700 to exchange information/data with other devices through a computer network such as the Internet and/or various kinds of telecommunications networks.

Various processes and processing described above, for example, the method 200, may be executed by the processing unit 701. For example, in some embodiments, the method 200 may be implemented as a computer software program that is tangibly embodied on a machine readable medium, for example, the storage unit 708. In some embodiments, part or all of the computer programs may be loaded and/or mounted onto the device 700 via ROM 702 and/or communication unit 709. When the computer program is loaded to the RAM 703 and executed by the CPU 701, one or more steps of the method 200 as described above may be executed.

As used herein, the term "includes" and its variants are to be read as open-ended terms that mean "includes, but is not limited to." The term "based on" is to be read as "based at least in part on." The term "one example embodiment" and "an example embodiment" are to be read as "at least one example embodiment." The terms "first", "second" and the like may refer to different or identical objects. This article may also include other explicit and implicit definitions.

As used herein, the term "determining" encompasses a wide variety of actions. For example, "determining" can include computing, computing, processing, deriving, investigating, looking up (for example, looking up in a table, database, or another data structure), ascertaining, and the like. Further, "determining" can include receiving (for example, receiving information), accessing (for example, accessing data in memory), and the like. Further, "determining" may include parsing, selecting, selecting, establishing, and the like.

It will be noted that the embodiments of the present disclosure can be implemented in software, hardware, or a combination thereof. The hardware part can be implemented by a special logic; the software part can be stored in a memory and executed by a suitable instruction execution system such as a microprocessor or a special purpose hardware. Ordinary skilled in the art may understand that the above method and system may be implemented with computer executable instructions and/or in processor-controlled code, for example, such code is provided on a carrier medium such as an optical or electronic signal bearer.

Further, although operations of the present methods are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, multiple steps may be merged into one step, and/or a step may be divided into multiple steps for execution. In practice, according to the embodiments of the present invention, the features and functions of two or more units described above may be embodied in one unit. On the contrary, the features and functions of one unit described above may be further embodied in more units.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims.

We claim:

1. A method for storage management, comprising:
   in accordance with a determination that an input/output (I/O) request of a storage system is received, determining a target storage device to which the I/O request is directed;
   in accordance with a determination that the target storage device is a storage device of a first type, processing the I/O request by accessing a data cache in a memory of the storage system; and
   in accordance with a determination that the target storage device is a storage device of a second type different from the first type, processing the I/O request by bypassing the data cache in order to access the target storage device directly, without accessing the data cache, and by bypassing a block buffer that is communicably coupled to the data cache, in order to access the target storage device directly without accessing the block buffer, the storage device of the second type having an access speed higher than that of the storage device of the first type.

2. The method of claim 1, wherein determining the target storage device comprises:
   determining whether target data to which the I/O request is directed has an identifier indicating that the target data is stored in the storage device of the second type;
   in accordance with a determination that the target data does not have the identifier, determining that the target storage device is the storage device of the first type; and
   in accordance with a determination that the target data has the identifier, determining that the target storage device is the storage device of the second type.

3. The method of claim 2, wherein the target data to which the I/O request is directed comprises a file; and
   wherein the identifier indicating that the target data is stored in the storage device of the second type comprises a flag in an inode of the file.

4. The method of claim 3, wherein the flag indicates that the file was allocated on the storage device of the second type.

5. The method of claim 3, wherein data on the target storage device is organized and managed as files.

6. The method of claim 1, further comprising:
   generating an identifier associated with data in the storage device of the second type to indicate that the data is stored in the storage device of the second type.

7. The method of claim 1, wherein processing the I/O request by accessing the data cache comprises:
   in accordance with a determination that the I/O request is to read data from the storage device of the first type, searching for the data in the data cache; and
   in accordance with a determination that the data is found in the data cache, reading the data from the data cache.

8. The method of claim 1, wherein processing the I/O request by accessing the data cache comprises:
   in accordance with a determination that the I/O request is to read data from the storage device of the first type, searching for the data in the data cache;
   in accordance with a determination that the data is not found in the data cache,
   reading the data from the storage device of the first type; and
   caching the data in the data cache.

9. The method of claim 1, wherein processing the I/O request by accessing the data cache comprises:
   in accordance with a determination that the I/O request is to write an updated version of data to the storage device of the first type, searching for a previous version of the data in the data cache;
   in accordance with a determination that the previous version is not found in the data cache,
   caching the updated version in the data cache; and
   writing the updated version to the storage device of the first type.

10. The method of claim 1, wherein processing the I/O request by accessing the data cache comprises:
    in accordance with a determination that the I/O request is to write an updated version of data to the storage device of the first type, searching for a previous version of the data in the data cache;
    in accordance with a determination that the previous version is found in the data cache,
    replacing the previous version in the data cache with the updated version; and
    writing the updated version to the storage device of the first type.

11. The method of claim 1, wherein processing the I/O request without accessing the data cache comprises:
    reading data from or writing data to the storage device of the second type via a memory bus of the storage system.

12. The method of claim 1, wherein an I/O request directed to the storage device of the second type is initially sent to a file data cache in the memory, wherein the file data cache is also used for caching data associated with the storage device of the first type in the data cache, wherein the file data cache is used only as a functional interface when processing the I/O request directed to the storage device of the second type, and wherein the I/O request directed to the storage device of the second type is subsequently performed on the storage device of the second type without accessing the data cache.

13. The method of claim 1, wherein the storage device of the second type comprises a 3D XPoint storage device.

14. An electronic device, comprising:
    at least one processor; and
    at least one memory storing computer program instructions, the at least one memory and the computer program instructions being configured, with the at least one processor, to cause the electronic device to:
    in accordance with a determination that an input/output (I/O) request of a storage system is received, determine a target storage device to which the I/O request is directed;
    in accordance with a determination that the target storage device is a storage device of a first type, process the I/O request by accessing a data cache in a memory of the storage system; and
    in accordance with a determination that the target storage device is a storage device of a second type different from the first type, process the I/O request by bypassing the data cache in order to access the target storage device directly, without accessing the data cache, and by bypassing a block buffer that is communicably coupled to the data cache, in order to access the target storage device directly without accessing the block buffer, the storage device of the second type having an access speed higher than that of the storage device of the first type.

15. The electronic device of claim 14, wherein the at least one memory and the computer program instructions are configured, with the at least one processor, to cause the electronic device to determine the target storage device by:
    determining whether target data to which the I/O request is directed has an identifier indicating that the target data is stored in the storage device of the second type;
    in accordance with a determination that the target data does not have the identifier, determining that the target storage device is the storage device of the first type; and
    in accordance with a determination that the target data has the identifier, determining that the target storage device is the storage device of the second type.

16. The electronic device of claim 14, wherein the at least one memory and the computer program instructions are further configured, with the at least one processor, to cause the electronic device to:

generate an identifier associated with data in the storage device of the second type to indicate that the data is stored in the storage device of the second type.

17. The electronic device of claim 14, wherein the at least one memory and the computer program instructions are configured, with the at least one processor, to cause the electronic device to process the I/O request by accessing the data cache by:
in accordance with a determination that the I/O request is to read data from the storage device of the first type, searching for the data in the data cache; and
in accordance with a determination that the data is found in the data cache, reading the data from the data cache.

18. The electronic device of claim 14, wherein the at least one memory and the computer program instructions are configured, with the at least one processor, to cause the electronic device to process the I/O request by accessing the data cache by:
in accordance with a determination that the I/O request is to read data from the storage device of the first type, searching for the data in the data cache;
in accordance with a determination that the data is not found in the data cache,
reading the data from the storage device of the first type; and
caching the data in the data cache.

19. The electronic device of claim 14, wherein the at least one memory and the computer program instructions are configured, with the at least one processor, to cause the electronic device to process the I/O request by accessing the data cache by:
in accordance with a determination that the I/O request is to write an updated version of data to the storage device of the first type, searching for a previous version of the data in the data cache;
in accordance with a determination that the previous version is not found in the data cache,
caching the updated version in the data cache; and
writing the updated version to the storage device of the first type.

20. The electronic device of claim 14, wherein the at least one memory and the computer program instructions are configured, with the at least one processor, to cause the electronic device to process the I/O request by accessing the data cache by:
in accordance with a determination that the I/O request is to write an updated version of data to the storage device of the first type, searching for a previous version of the data in the data cache;
in accordance with a determination that the previous version is found in the data cache,
replacing the previous version in the data cache with the updated version; and
writing the updated version to the storage device of the first type.

21. The electronic device of claim 14, wherein the at least one memory and the computer program instructions are configured, with the at least one processor, to cause the electronic device to process the I/O request without accessing the data cache by:
reading data from or writing data to the storage device of the second type via a memory bus of the storage system.

22. The electronic device of claim 14, wherein an I/O request directed to the storage device of the second type is initially sent to a file data cache in the memory, wherein the file data cache is also used for caching data associated with the storage device of the first type in the data cache, wherein the file data cache is used only as a functional interface when processing the I/O request directed to the storage device of the second type, and wherein the I/O request directed to the storage device of the second type is subsequently performed on the storage device of the second type without accessing the data cache.

23. The electronic device of claim 14, wherein the storage device of the second type comprises a 3D XPoint storage device.

24. A computer program product having a non-transitory computer readable medium which stores a set of instructions to perform storage management; the set of instructions, when carried out by computerized circuitry, causing the computerized circuitry to perform a method of:
in accordance with a determination that an input/output (I/O) request of a storage system is received, determining a target storage device to which the I/O request is directed;
in accordance with a determination that the target storage device is a storage device of a first type, processing the I/O request by accessing a data cache in a memory of the storage system; and
in accordance with a determination that the target storage device is a storage device of a second type different from the first type, processing the I/O request by bypassing the data cache in order to access the target storage device directly, without accessing the data cache, and by bypassing a block buffer that is communicably coupled to the data cache, in order to access the target storage device directly without accessing the block buffer, the storage device of the second type having an access speed higher than that of the storage device of the first type.

* * * * *